United States Patent
Funke et al.

(10) Patent No.: US 6,724,437 B2
(45) Date of Patent: *Apr. 20, 2004

(54) METHOD AND DEVICE FOR ADDING NOISE TO A VIDEO SIGNAL FOR IMPROVING A DISPLAY OF THE VIDEO SIGNAL

(75) Inventors: Eric P. Funke, Eindhoven (NL); Jeroen H. C. J. Stessen, Eindhoven (NL); Age J. Van Dalfsen, Eindhoven (NL)

(73) Assignee: Koninklijke Philips Electronics N.V., Eindhoven (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/218,553

(22) Filed: Dec. 22, 1998

(65) Prior Publication Data

US 2003/0133045 A1 Jul. 17, 2003

(30) Foreign Application Priority Data

Jun. 17, 1998 (EP) .............................. 98202023

(51) Int. Cl.$^7$ ................................. H04N 5/21
(52) U.S. Cl. .................. 348/622; 348/574; 348/607; 348/613; 345/204; 345/596
(58) Field of Search ........................ 348/607, 608, 348/613, 622, 674, 241, 254, 574; 345/204, 596, 690, 694; 358/447, 3.13; 341/131, 155, 126; 382/274, 275, 162

(56) References Cited

U.S. PATENT DOCUMENTS

| | | | | | |
|---|---|---|---|---|---|
| 3,562,420 A | * | 2/1971 | Thompson | ..................... | 178/6 |
| 4,460,924 A | * | 7/1984 | Lippel | ......................... | 386/44 |
| 4,568,966 A | * | 2/1986 | Lippel | ......................... | 386/21 |
| 4,654,704 A | * | 3/1987 | Lippel | ......................... | 380/15 |
| 5,087,975 A | * | 2/1992 | Citta et al. | ..................... | 348/21 |
| 5,323,247 A | * | 6/1994 | Parker et al. | ............... | 358/456 |
| 5,363,144 A | * | 11/1994 | Park | ........................... | 348/614 |
| 5,455,839 A | * | 10/1995 | Eyuboglu | ..................... | 375/265 |
| 5,512,957 A | * | 4/1996 | Hulyalkar | .................... | 348/607 |
| 5,525,984 A | * | 6/1996 | Bunker | ........................ | 341/131 |
| 5,602,583 A | * | 2/1997 | Citta | ............................ | 348/21 |
| 5,909,512 A | * | 6/1999 | Ohshima et al. | ............ | 382/251 |
| 5,936,617 A | * | 8/1999 | Uchino et al. | .............. | 345/204 |

\* cited by examiner

*Primary Examiner*—Michael H. Lee
*Assistant Examiner*—Jean W. Désir

(57) ABSTRACT

In a display driving method, noise is added (NG, AD) to a video signal before the video signal is subjected to a dithering operation (DC). The invention is preferably applied to render non-moving dither patterns invisible in a plasma display panel driving method in which the display signal is subjected to a (Floyd-Steinberg) dithering.

5 Claims, 1 Drawing Sheet

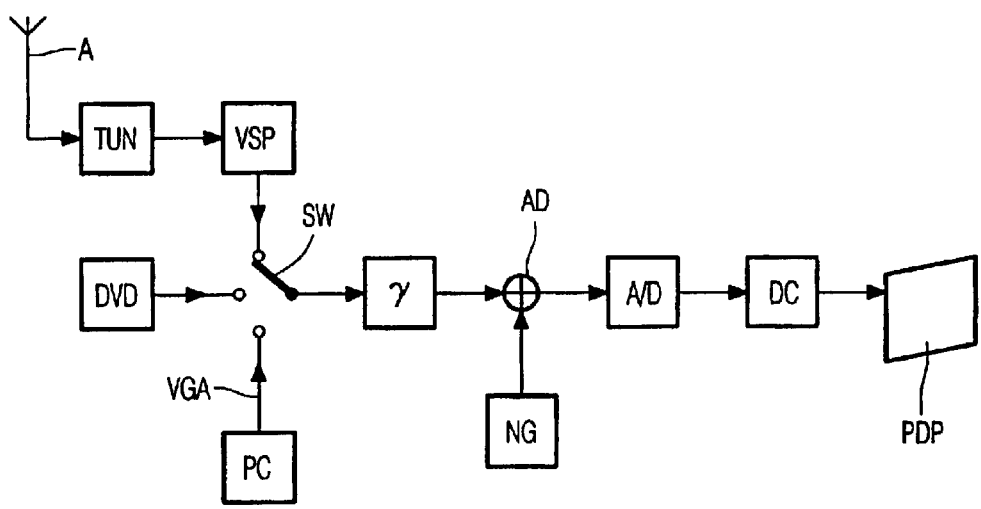

METHOD AND DEVICE FOR ADDING NOISE TO A VIDEO SIGNAL FOR IMPROVING A DISPLAY OF THE VIDEO SIGNAL

BACKGROUND OF THE INVENTION

1. Field of the Invention

The invention relates to a method of and device for driving a display, more specifically, a matrix display, such as, a plasma display panel, and to a display apparatus in which such a method is used.

2. Description of the Related Art

In plasma display panels, a (Floyd-Steinberg) dithering method is used for reproducing true colors. However, especially in dark gray areas, this dithering appears to cause visible stable dither patterns.

SUMMARY OF THE INVENTION

It is, inter alia, an object of the invention to provide a display driving technique which causes less artifacts. To this end, a first aspect of the invention provides a display driving method and device. A second aspect of the invention provides a display apparatus including such a display driving device.

In a display driving method in accordance with a primary aspect of the invention, noise is added to a video signal before the video signal is subjected to a dithering operation.

BRIEF DESCRIPTION OF THE DRAWING

These and other aspects of the invention will be apparent from and elucidated with reference to the embodiments described hereinafter, with reference to the drawing, in which:

The sole FIGURE shows an embodiment of a display apparatus in accordance with the present invention.

DESCRIPTION OF THE PREFERRED EMBODIMENTS

In the embodiment shown in the FIGURE, a television signal is picked up by an antenna A, down-converted to a baseband video signal by a tuner TUN, and subjected to various video signal processing operations by a video signal processor VSP to provide a first video signal. A digital versatile disk player DVD furnishes another possible signal for display. A personal computer PC furnishes a third possible video signal in VGA format. Obviously, other video signal sources, such as, a laserdisc player, are possible as well. A switch SW selects one of the video signals. The selected signal is subjected to a gamma correction by a gamma correction circuit γ. In accordance with the present invention, a noise signal generated by a noise generator NG is added to the output signal of the gamma correction circuit γ by an adder AD. The output signal of the adder AD is applied to an A/D converter, whereafter, the signal is subjected to a dithering operation by a dithering circuit DC. An output signal of the dithering circuit DC is displayed on a plasma display panel PDP.

The noise generator NG produces a small amount of noise, corresponding to about 0.5 least significant bit (LSB), obtained by a pseudo-random noise generator. The precise amount of added noise depends on the amount of noise already present in the signal and already added in preceding video signal operations. Preferably, only negative noise is added to ensure that black remains black. That only negative noise is added is accomplished by ensuring that during the measurement interval of a black level measurement loop, the output signal of the noise generator NG is high. The A/D converter is adjusted to this high output level of the noise generator NG in that the lowest possible output signal of the A/D converter corresponds to a high output signal of the noise generator NG, so that when the noise generator NG starts to generates zeros again, these zeros result in that the video information becomes somewhat smaller, while if ones are generated by the noise generator NG, the video information is unaffected. The noise is preferably added at a high-ohmic point in the circuit to allow for a simple noise insertion by means of a resistor.

As a result of the addition of this small amount of noise, the non-moving dither patterns disappear. Just above the black level, the noise is no longer perceivable; there are hardly any negative effects. The noise is only negative so that black remains black.

Advantageously, the gray-scale reproduction appears to be improved as well by the addition of a small amount of noise. The noise results in that the bit transitions are obscured, without adding information. The result is a smoother image. This result could easily be obtained by adding noise in the analog domain, i.e., before the A/D converter.

It should be noted that the above-mentioned embodiments illustrate rather than limit the invention, and that those skilled in the art will be able to design many alternative embodiments without departing from the scope of the appended claims. The invention can be applied with all dithering displays; a plasma display panel (PDP) is just one example of such a display. The invention can be implemented by means of hardware comprising several distinct elements, and by means of a suitably programmed computer. In the device claim enumerating several means, several of these means can be embodied by one and the same item of hardware.

What is claimed is:

1. A display driving method, comprising:
   furnishing a video signal;
   adding noise to said video signal to form an enhanced signal; and
   dithering said enhanced signal to form a display signal, wherein said noise adding step comprises adding only negative components of noise to said video signal.

2. A method as claimed in claim 1, wherein said method further comprises analog-to-digital converting said enhanced signal before said dithering step.

3. A display driving device, comprising:
   means for furnishing a video signal;
   means for generating a noise signal;
   means for adding said noise signal to said video signal to form an enhanced signal; and
   means for dithering said enhanced signal to form a display signal,
   wherein said generating means generates only negative components of noise, and said adding means adds said negative noise components to the video signal to form said enhance signal.

4. A display apparatus, comprising:
   means for furnishing a video signal;
   means for generating a noise signal;
   means for adding said noise signal to said video signal to form an enhanced signal;

means for dithering said enhanced signal to form a display signal; and a display for displaying said display signal, wherein said generating means generates only negative components of noise, and said adding means adds said negative noise components to the video signal to form said enhance signal.

5. The display apparatus as claimed in claim 4, wherein said display apparatus further comprises:

an analog-to-digital converter for digitizing said enhanced signal, wherein said dithering means dithers said digitized enhanced signal.

* * * * *